United States Patent
Akaike et al.

(10) Patent No.: US 10,773,607 B2
(45) Date of Patent: Sep. 15, 2020

(54) VEHICLE SEAT STRUCTURE

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 18 days.

(21) Appl. No.: 16/180,507

(22) Filed: Nov. 5, 2018

(65) Prior Publication Data

US 2019/0143845 A1 May 16, 2019

(30) Foreign Application Priority Data

Nov. 10, 2017 (JP) ................................ 2017-217129

(51) Int. Cl.
*B60N 2/01* (2006.01)
*B60N 2/06* (2006.01)
*B60N 2/14* (2006.01)

(52) U.S. Cl.
CPC ................ *B60N 2/01* (2013.01); *B60N 2/06* (2013.01); *B60N 2/146* (2013.01)

(58) Field of Classification Search
CPC .......... B60N 2/01; B60N 2/06; B60N 2/0735; B60N 2/14; B60N 2/143; B60N 2002/022
USPC ....................................................... 296/64
See application file for complete search history.

(56) References Cited

U.S. PATENT DOCUMENTS

| | | | | |
|---|---|---|---|---|
| 3,322,463 A | * | 5/1967 | Neale | B60N 2/01 297/411.3 |
| 4,341,415 A | * | 7/1982 | Braun | B60N 2/06 296/64 |
| 2008/0290706 A1 | * | 11/2008 | Yamada | B60N 2/01591 297/240 |
| 2017/0028876 A1 | * | 2/2017 | Yamada | B60N 2/012 |
| 2017/0028987 A1 | | 2/2017 | Yamada | |
| 2017/0210329 A1 | * | 7/2017 | Rao | B60R 21/0136 |
| 2017/0225593 A1 | * | 8/2017 | De Saulles | B60N 2/06 |
| 2017/0246966 A1 | | 8/2017 | Hayashi | |
| 2018/0009348 A1 | * | 1/2018 | Deshmukh | B60N 2/503 |
| 2018/0105067 A1 | * | 4/2018 | Ajisaka | B60N 2/012 |
| 2019/0126787 A1 | * | 5/2019 | Line | B60N 2/06 |

(Continued)

FOREIGN PATENT DOCUMENTS

| | | | | |
|---|---|---|---|---|
| FR | 2728860 | * | 7/1995 | ............... B60N 2/01 |
| JP | 2010-274713 | | 12/2010 | |

(Continued)

*Primary Examiner* — Gregory A Blankenship
(74) *Attorney, Agent, or Firm* — Greenblum & Bernstein, P.L.C.

(57) ABSTRACT

A vehicle seat structure including: a mode switching mechanism including: a rotating mechanism which is configured to switch one seat of two seats between a state where the one seat faces a vehicle front direction and a state where the one seat faces a vehicle rear direction by rotating the one seat; and a slide mechanism which is configured to move another seat of the two seats from a laterally located position where the other seat is located side by side with the one seat to a vertically located position where the other seat is located to face, in the front-rear direction, the one seat facing the vehicle rear direction by obliquely sliding the other seat in a rear direction and in the seat width direction from the laterally located position.

13 Claims, 10 Drawing Sheets

(56) References Cited

U.S. PATENT DOCUMENTS

| | | | | |
|---|---|---|---|---|
| 2019/0143845 A1* | 5/2019 | Akaike | ............. | B64D 11/0648 |
| | | | | 297/240 |
| 2019/0225167 A1* | 7/2019 | Takamura | ................ | B60N 2/01 |
| 2019/0263295 A1* | 8/2019 | Dry | ....................... | B60N 2/062 |
| 2019/0344750 A1* | 11/2019 | Takata | ................. | B60R 25/014 |
| 2019/0359086 A1* | 11/2019 | Akaike | ................... | B60N 2/12 |
| 2020/0001747 A1* | 1/2020 | Faruque | .................. | B60N 2/06 |

FOREIGN PATENT DOCUMENTS

| | | |
|---|---|---|
| JP | 2017-24653 | 2/2017 |
| JP | 2017-154533 | 9/2017 |

* cited by examiner

VEHICLE SEAT STRUCTURE

CROSS-REFERENCE TO RELATED APPLICATIONS

This application claims priority from Japanese Patent Application No. 2017-217129 filed on Nov. 10, 2017, the entire contents of which are incorporated herein by reference.

TECHNICAL FIELD

The present disclosure relates to a vehicle seat structure, and in particular to a vehicle seat structure including a mode switching mechanism which is configured to switch configurations of two seats between a laterally located mode in which seated occupants can be seated on the two seats side by side in a seat width direction and a facing mode in which the seated occupants can be seated on the two seats to face each other in a front-rear direction.

There has been known a vehicle seat structure through which a front seat arranged in a vehicle interior is switched to face a rear direction so as to be switched to a mode capable of facing a rear seat (JP-A-2017-24653).

In the above-described technology, in order to move one seat forming the facing mode to a position facing the other seat from a position next to the other seat, it is necessary to make the one seat detour along a rail extending in a front-rear direction and a rail extending in a left-right direction placed on a floor, and a moving space is increased.

SUMMARY

The present disclosure has been made to solve the above problem, and the problem to be solved by the present disclosure is to, in a vehicle seat structure capable of being switched to a facing mode, enable a vehicle seat to be switched to a facing mode with a small moving space.

According to an aspect, there is provided a vehicle seat structure including: a mode switching mechanism which is configured to switch configurations of two seats between a laterally located mode in which seated occupants can be seated on the two seats side by side in a seat width direction and a facing mode in which the seated occupants can be seated on the two seats to face each other in a front-rear direction, wherein the mode switching mechanism includes: a rotating mechanism which is configured to switch one seat of the two seats between a state where the one seat faces a vehicle front direction and a state where the one seat faces a vehicle rear direction by rotating the one seat; and a slide mechanism which is configured to move another seat of the two seats from a laterally located position where the other seat is located side by side with the one seat to a vertically located position where the other seat is located to face, in the front-rear direction, the one seat facing the vehicle rear direction by obliquely sliding the other seat in a rear direction and in the seat width direction from the laterally located position.

According to the aspect, when forming the facing mode, the other seat can be switched to the facing mode in a small moving space through obliquely sliding in the rear direction and in the seat width direction by the slide mechanism. Further, when returning from the facing mode to the laterally located mode, the other seat can be switched to the laterally located mode in a small moving space.

DETAILED DESCRIPTION

Hereinafter embodiments for implementing the present disclosure will be described with reference to the drawings.

Embodiment 1

Schematic Configuration of Seat Structure 1

First, a seat structure 1 (a vehicle seat structure) of Embodiment 1 will be described with reference to FIGS. 1 to 9. In the following description, directions such as front, rear, upper, lower, left and right refer to respective directions shown in each drawing. A "seat width direction" refers to a left-right direction of a right seat 10 and a left seat 20 described later.

Figure 1:
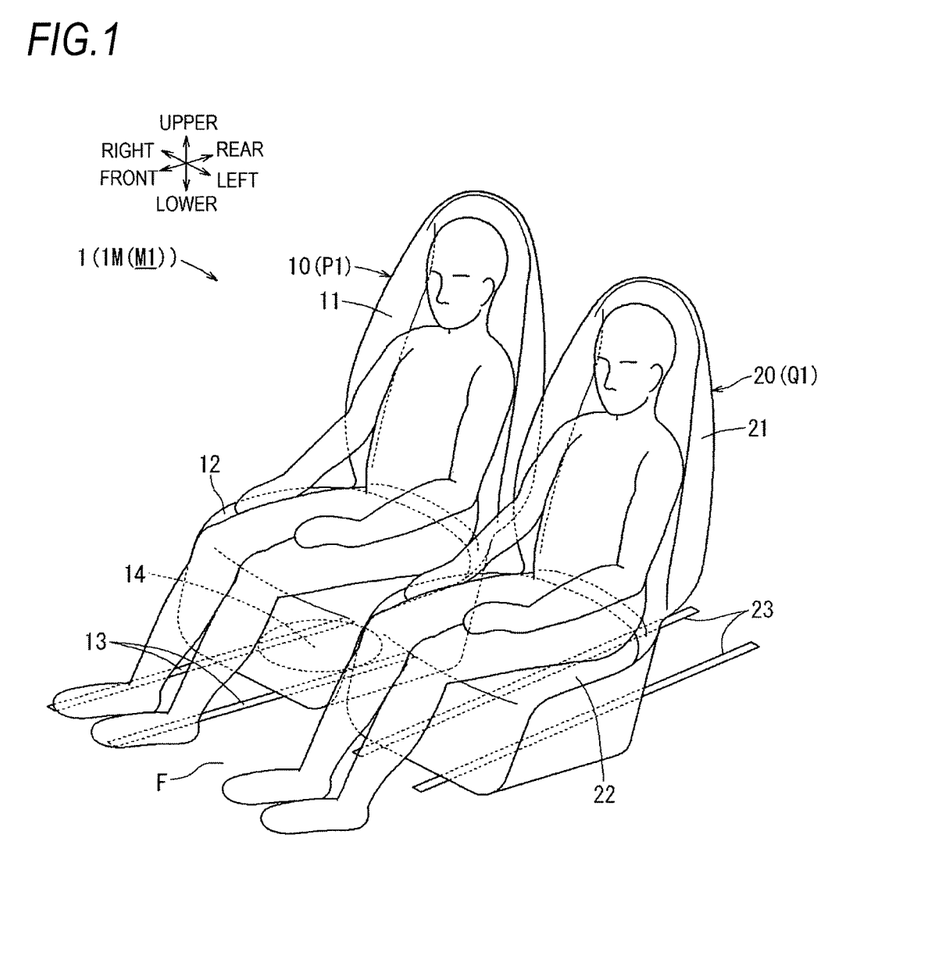
FIG. 1 is a perspective view showing a schematic configuration of a vehicle seat structure according to Embodiment 1.
Figure 2:
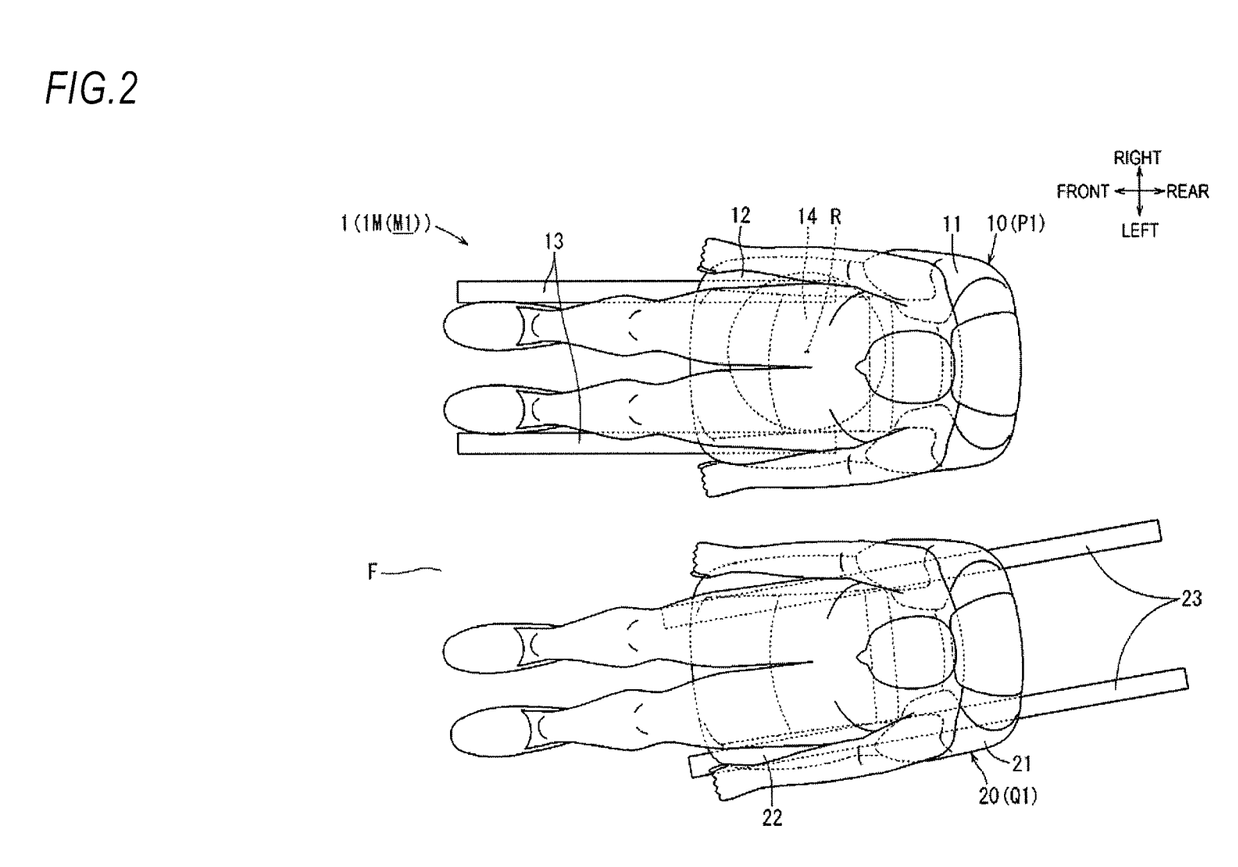
FIG. 2 is a plan view of FIG. 1 showing a seating state in a laterally located mode.
Figure 5:
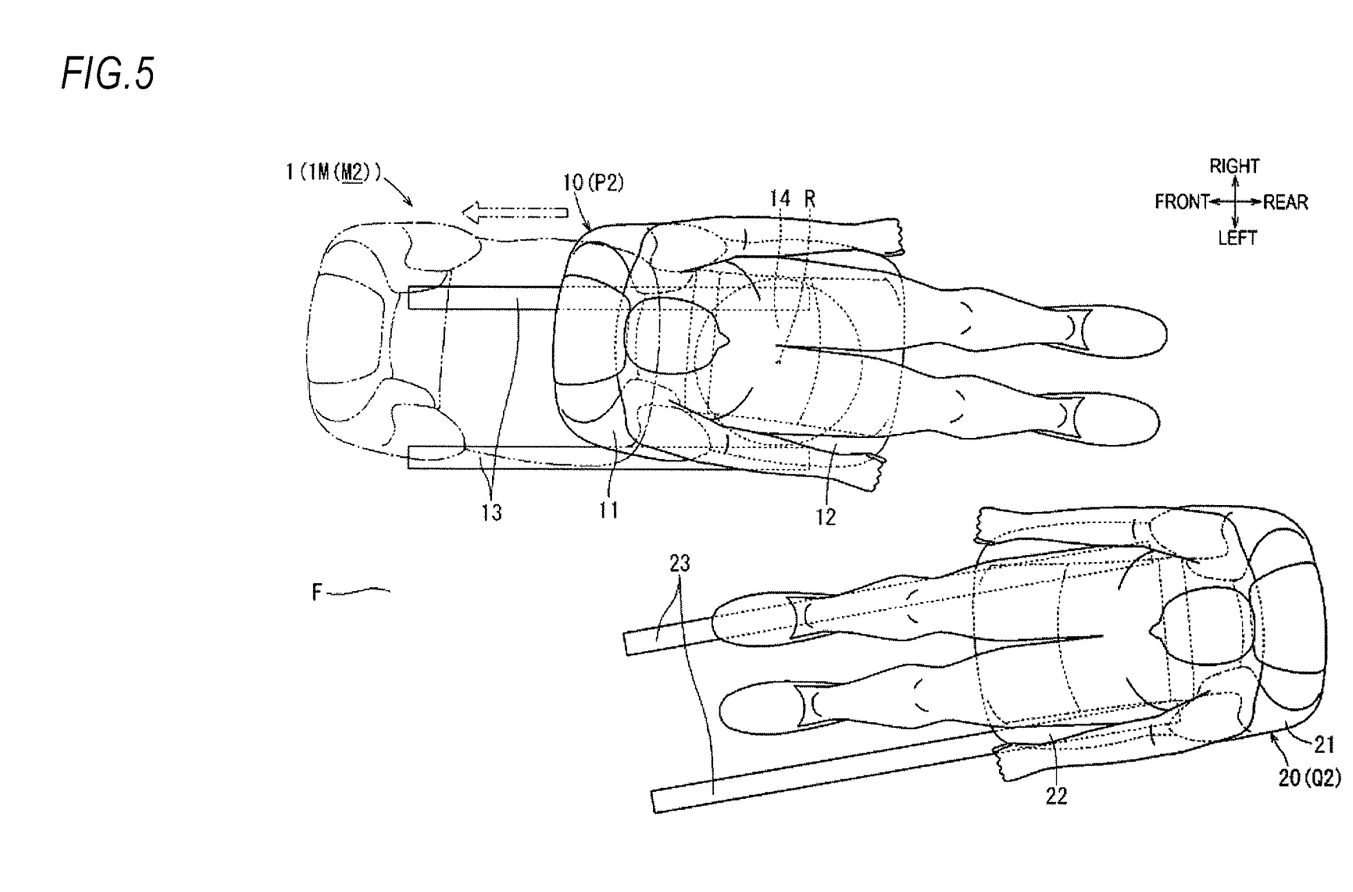
FIG. 5 is a plan view showing a seating state in a facing mode.

The seat structure 1 of the present embodiment includes a mode switching mechanism 1M which is capable of switching an arrangement relationship between the right seat 10 and the left seat 20 provided as front seats of an automobile to a laterally located mode M1 in which occupants can be seated side by side as shown in FIGS. 1 and 2 and a facing mode M2 in which the occupants can be seated facing each other in a front-rear direction as shown in FIG. 5. Here, the right seat 10 corresponds to "the one seat" of the present disclosure, and the left seat 20 corresponds to the "other seat" of the present disclosure.

Specifically, the mode switching mechanism 1M is configured by a combination of a rotating mechanism 14 provided on the right seat 10 and a slide mechanism 23 in the front-rear direction provided on the left seat 20. The rotating mechanism 14 can switch the right seat 10 from a vehicle front direction P1 where the right seat 10 is substantially straightly oriented toward a front side as shown in FIGS. 1 and 2 to a vehicle rear direction P2 where the right seat 10 is rotated horizontally in a counterclockwise direction (inward rotation) which is a vehicle inner side with respect to a vehicle floor surface F and substantially straightly oriented (slightly inward) toward a rear side as shown in FIG. 4.

Figure 3:
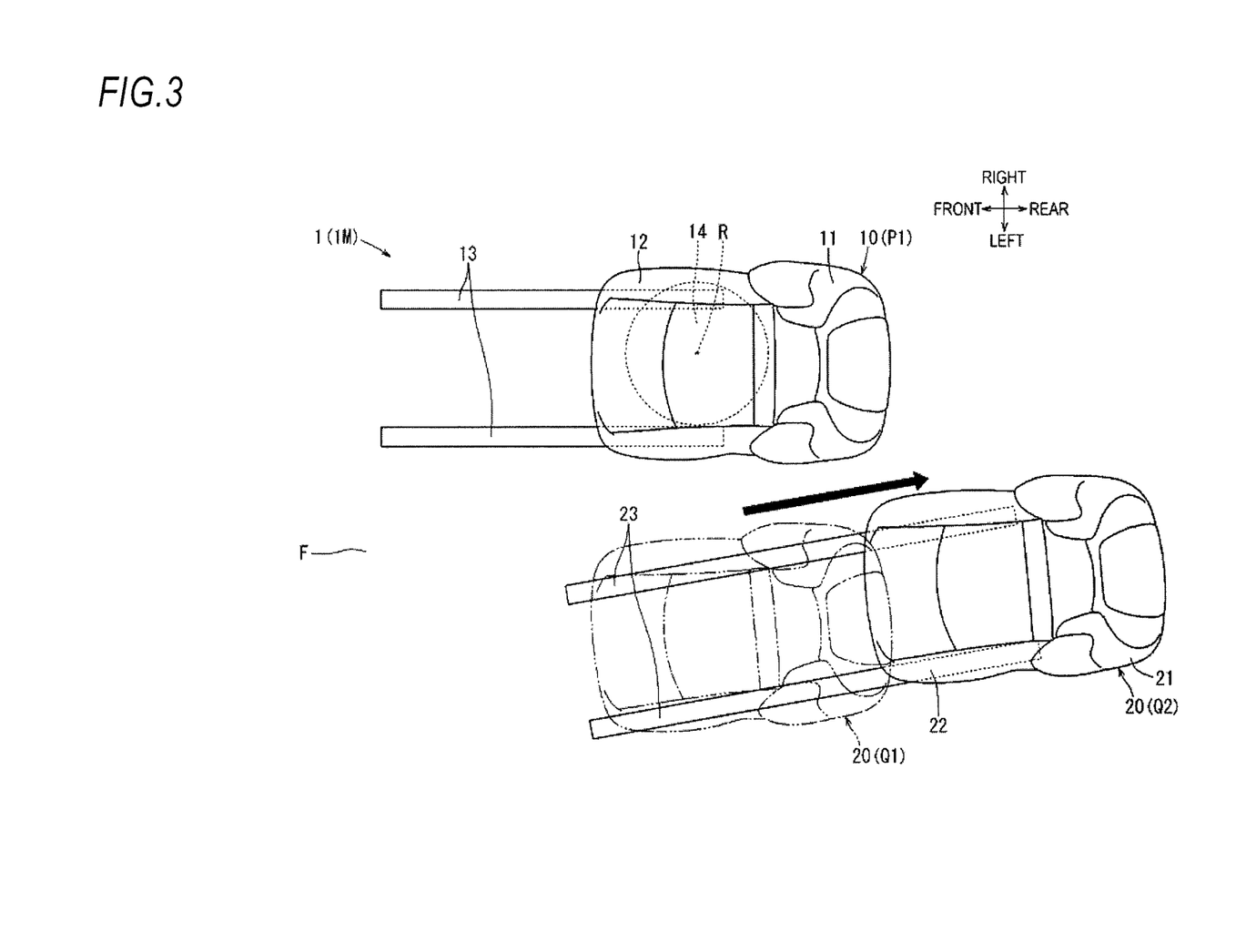
FIG. 3 is a plan view showing a state where a left seat from FIG. 2 is retracted to a vertically located position.

Further, the slide mechanism 23 can switch the left seat 20 from a laterally located position Q1 where the left seat 20 is located side by side with the right seat 10 as shown in FIGS. 1 and 2 to a vertically located position Q2 where the left seat 20 is located in a state of sliding straight and obliquely rightward and rearward with respect to the vehicle floor surface F so as to be arranged in the front-rear direction with the right seat 10 as shown in FIG. 3. The vertically located position Q2 of the left seat 20 is set as a position completely beyond the right seat 10 in the rear direction.

Figure 4:
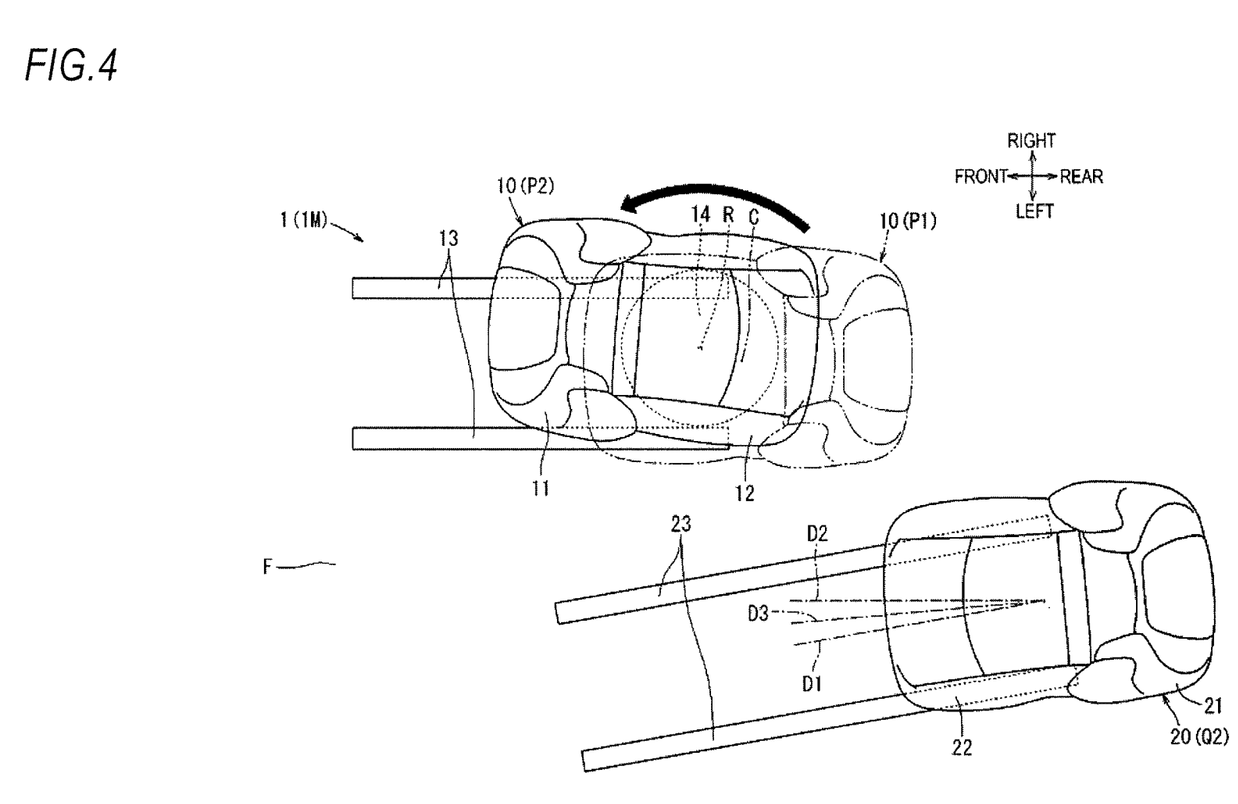
FIG. 4 is a plan view showing a state where a right seat from FIG. 3 is switched to a vehicle rear direction.

Therefore, after the left seat 20 is slid from the laterally located position Q1 to the vertically located position Q2 as described above, the right seat 10 is switched from the vehicle front direction P1 to the vehicle rear direction P2 as shown in FIG. 4, and thus as shown in FIG. 5, the right seat 10 and the left seat 20 can be brought into a state of a facing mode M2 where the right seat 10 and the left seat 20 face each other in the front-rear direction. Here, the switching to the facing mode M2 may be a procedure in which the right seat 10 is switched from the vehicle front direction P1 to the vehicle rear direction P2, and then the left seat 20 is switched from the laterally located position Q1 to the vertically located position Q2.

As shown in FIGS. 1 and 2, the right seat 10 includes a seat back 11 serving as a backrest portion of a seated occupant, a seat cushion 12 serving as a seating portion, and a slide mechanism 13 which is connected to the right seat 10 in a state where the right seat 10 can slide straight in the front-rear direction with respect to the vehicle floor surface F. The right seat 10 is rotatably connected to the vehicle floor surface F by the rotating mechanism 14, and can be rotated in each of the inside and the outside directions by an operation of releasing a locking mechanism (not shown) and can be rotationally locked at any position. The specific configuration of the slide mechanism 13 is the same as the known configuration disclosed in a document such as JP-A-2017-154533, and therefore a detailed description thereof will be omitted. The specific configuration of the rotating mechanism 14 is the same as the known configuration disclosed in a document such as JP-A-2010-274713, and therefore a detailed description thereof will be omitted.

As shown in FIG. 4, a rotation center R of rotating the right seat 10 by the rotating mechanism 14 is set at a position eccentric, in a plan view, from a shape center C of the right seat 10 rightward and forward. According to the above position setting, when the right seat 10 is rotated inward between the vehicle front direction P1 and the vehicle rear direction P2, the rotating mechanism 14 can rotate the right seat 10 inward in a form in which the protruding of the right seat 10 to the rear side and the left side where the left seat 20 is located is suppressed. Further, the protruding of the right seat 10 to the left side and the rear side is suppressed by switching the right seat 10 from the vehicle front direction P1 to the vehicle rear direction P2, and a space between the left seat 20 and the right seat 10 can be widened when the left seat 20 is moved obliquely rightward and rearward from the laterally located position Q1 to the vertically located position Q2 or after the left seat 20 is moved.

Meanwhile, the left seat 20 also includes a seat back 21 serving as a backrest portion of a seated occupant and a seat cushion 22 serving as a seating portion. The left seat 20 is connected to the vehicle floor surface F by the slide mechanism 23 in a state of obliquely sliding in the front-rear direction, and can slide in each of the front and rear directions by an operation of releasing the locking mechanism (not shown) and can be slide locked at any position. The specific configuration of the slide mechanism 23 is the same as the known configuration disclosed in a document such as JP-A-2017-154533, and therefore a detailed description thereof will be omitted.

The left seat 20 is not straight oriented in a left-oblique front sliding direction D1 by the slide mechanism 23, but is disposed at an angle of a left-oblique front direction D3 between the left-oblique front sliding direction D1 and a vehicle front direction D2 with respect to the vehicle floor F. With the above-described direction setting, even if the sliding direction D1 of the left seat 20 is a left-oblique front direction, the direction of the occupant seated on the left seat 20 can be made close to the direction of the occupant seated on the right seat 10 more easily.

That is, as shown in FIGS. 1 and 2, when the left seat 20 and the right seat 10 are in the laterally located mode M1, the direction of the occupant seated on the left seat 20 can be brought close to the direction of the occupant seated on the right seat 10 (the vehicle front direction P1), and the occupant can be seated side by side in a state where the directions of the occupants are closer. Further, as shown in FIG. 5, when the left seat 20 and the right seat 10 are in the facing mode M2, the direction of the occupant seated on the left seat 20 can be brought close to a direction facing the occupant seated on the right seat 10 (the vehicle rear direction P2), and the directions of occupants can more straightly face each other.

Here, by sliding the right seat 10 from the state of the facing mode M2 to the front side of the vehicle (a rear side for the right seat 10 in the vehicle rear direction P2) by the slide mechanism 13, it is possible to create the facing mode M2 with a wider space between the right seat 10 and the left seat 20 (see a state of an imaginary line in FIG. 5). Here, the left-oblique front direction D3 corresponds to the "oblique front direction" of the present disclosure.

Further, the mode switching mechanism 1M can also switch the right seat 10 and the left seat 20 from a state where the right seat 10 and the left seat 20 are set in the laterally located mode M1 as shown in FIGS. 1 and 2 to a close mode M3 where the right seat 10 comes close to the left seat 20 which is oriented in the left-oblique front direction D3 laterally by rotating the right seat 10 from the vehicle front direction P1 to an obliquely inward direction P3 that is rotated inward (counterclockwise) by 45 degrees or less while the left seat 20 is slightly moved from the laterally located position Q1 to the rear side by the slide mechanism 23. The close mode M3 allows the direction of the occupant seated on the right seat 10 to be brought close to the direction of the occupant seated on the left seat 20 (the left-oblique front direction D3), and the two persons can enjoy conversation while viewing the same scene.

Figure 6:
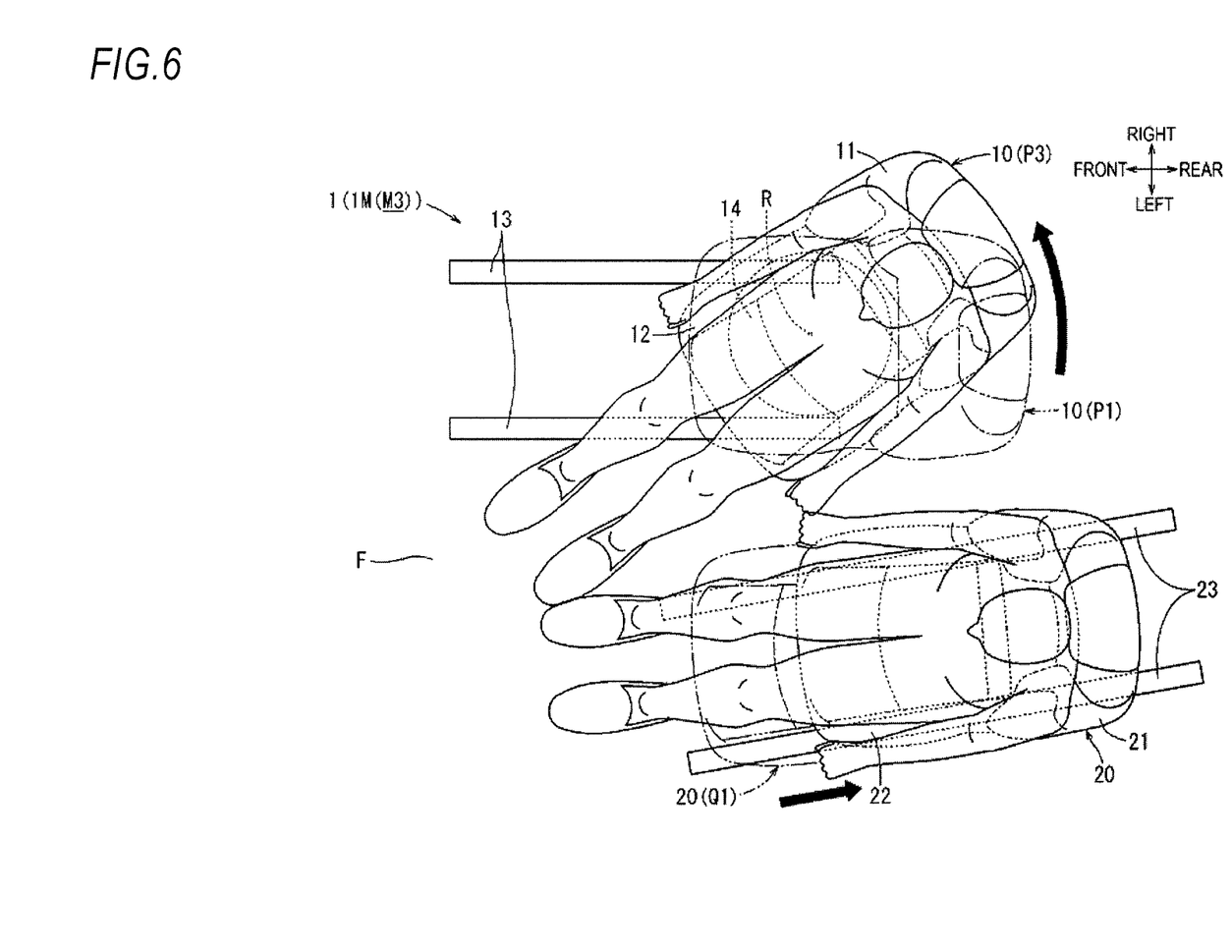
FIG. 6 is a plan view showing a seating state in a close mode.
Figure 7:
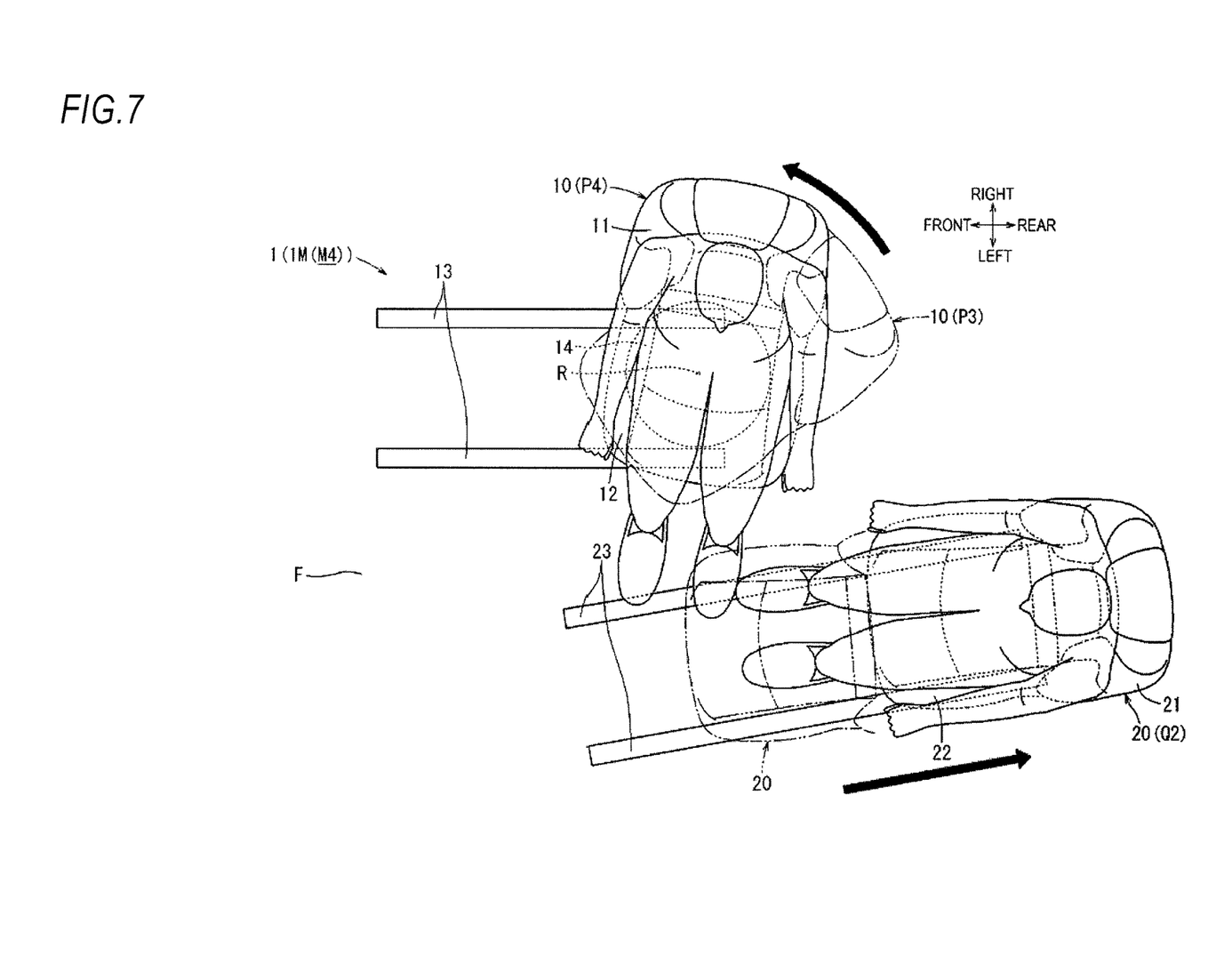
FIG. 7 is a plan view showing a seating state in a conversation mode.

Further, as shown in FIG. 7, the mode switching mechanism 1M can also switch the right seat 10 and the left seat 20 from a state of the close mode M3 described with reference to FIG. 6 to a conversation mode M4 in which the right seat 10 and the left seat 20 face each other at an oblique angle by rotating the right seat 10 from the obliquely inward direction P3 to an inward direction P4 (leftward) while the left seat 20 is moved from the laterally located position Q1 to the rear side. The conversation mode M4 allows the occupant seated on the right seat 10 and the occupant seated on the left seat 20 to be oriented in a direction where the occupants easily have conversation with each other.

Figure 8:
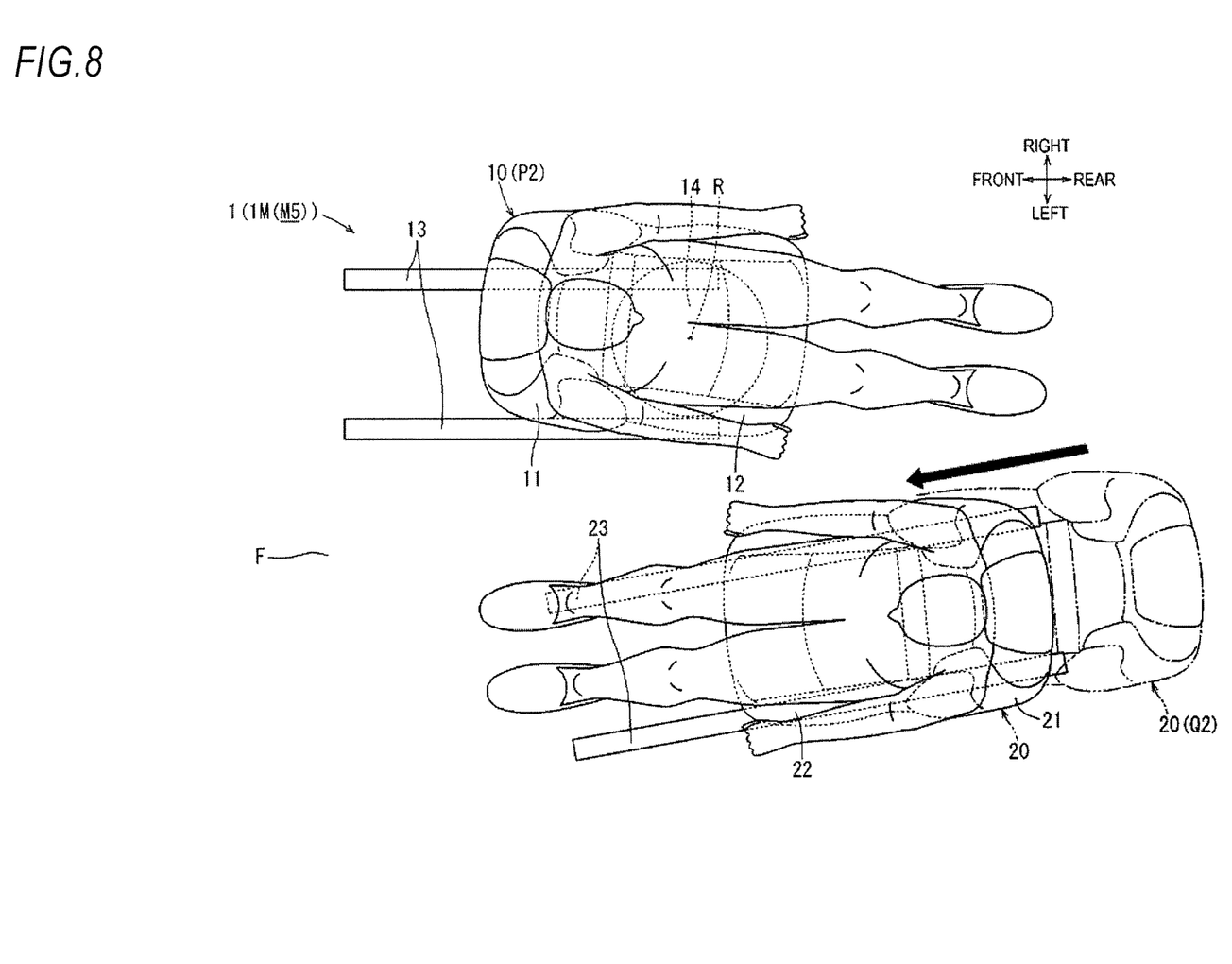
FIG. 8 is a plan view showing a seating state in a relaxed mode.

As shown in FIG. 8, the mode switching mechanism 1M can also switch the right seat 10 and the left seat 20 to a relaxed mode M5 in which the right seat 10 in the vehicle rear direction P2 and the left seat 20 moving obliquely forward and leftward from the vertically located position Q2 are made to have a wide gap in the seat width direction therebetween and a wide foot space is formed in the direction to which the seated occupants faces by sliding the left seat 20 obliquely leftward and forward from the vertically located position Q2 from the state of the facing mode M2 described with reference to FIG. 5. Specifically, in the state of the relaxed mode M5 shown in FIG. 8, the left seat 20 is moved obliquely leftward and forward to a position slightly overlapping with the right seat 10 in the front-rear direction.

Figure 9:
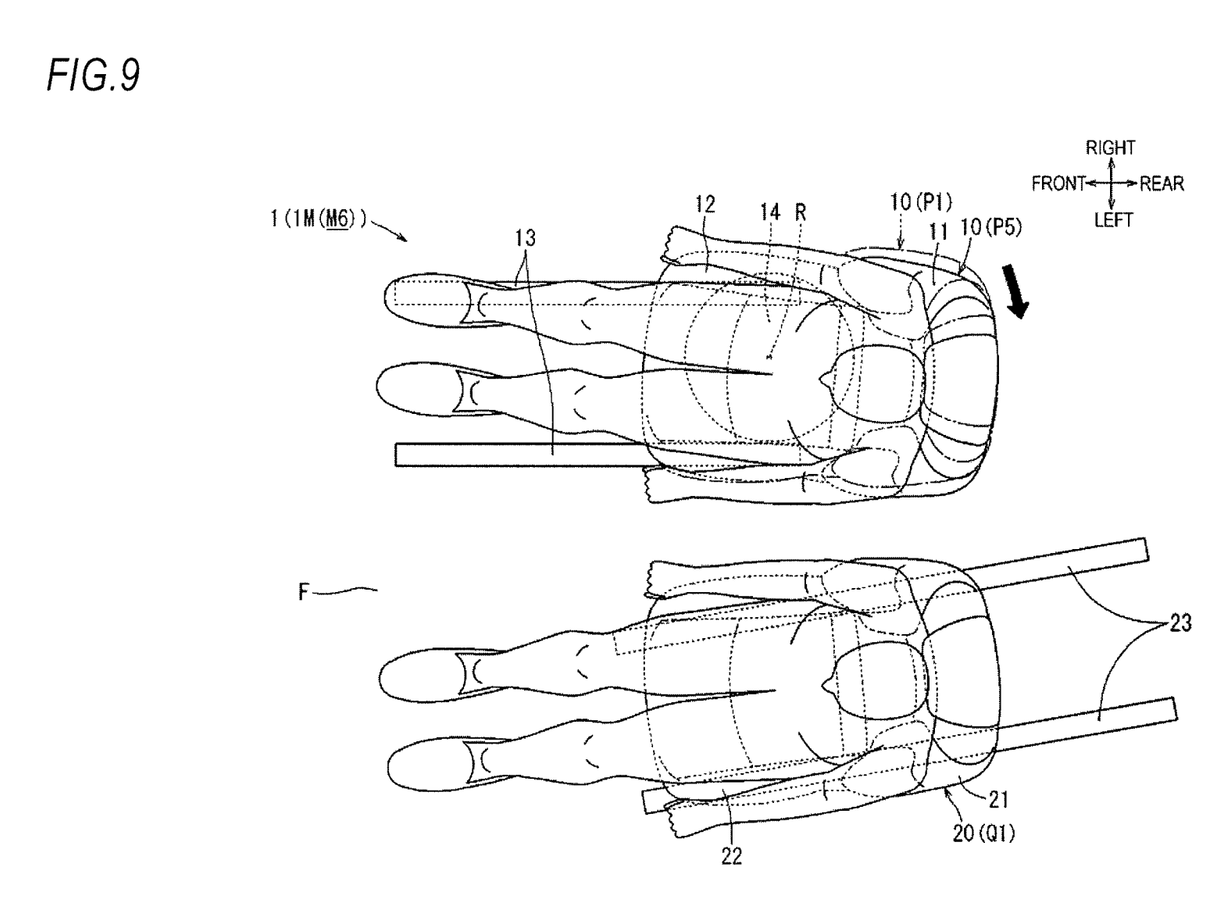
FIG. 9 is a plan view showing a seating state in a personal mode.

Further, as shown in FIG. 9, the mode switching mechanism 1M can also switch the right seat 10 and the left seat 20 to a personal mode M6 in which the occupant seated on the right seat 10 and the occupant seated on the left seat 20 are less likely to enter each other's field of view by switching from the state of the laterally located mode M1 described with reference to FIG. 2 to the state of an obliquely outward direction P5 where the right seat 10 is rotated slightly outward. As described above, the positional relationship between the right seat 10 and the left seat 20 can be changed in various ways by the mode switching mechanism 1M.

Summary

In summary, the seat structure 1 of the present embodiment has the following configuration. That is, a vehicle seat structure (1) includes a mode switching mechanism (1M) which is configured to switch configurations of two seats (10, 20) between a laterally located mode (M1) in which seated occupants can be seated on the two seats (10, 20) side by side in a seat width direction and a facing mode (M2) in which the seated occupants can be seated on the two seats (10, 20) to face each other in a front-rear direction.

The mode switching mechanism (1M) includes: a rotating mechanism (14) which is configured to switch one seat (10) of the two seats (10, 20) between a state where the one seat (10) faces a vehicle front direction (P1) and a state where the one seat (10) faces a vehicle rear direction (P2) by rotating the one seat (10), and a slide mechanism (23) which is configured to move another seat (20) of the two seats (10, 20) from a laterally located position (Q1) where the other seat (20) is located side by side with the one seat (10) to a vertically located position (Q2) where the other seat (20) is located to face, in the front-rear direction, the one seat (10) facing the vehicle rear direction (P2) by obliquely sliding the other seat in a rear direction and in the seat width direction from the laterally located position (Q1).

With such a configuration, when forming the facing mode (M2), the other seat (20) can be switched to the facing mode (M2) in a small moving space through obliquely sliding in the rear direction and in the seat width direction by the slide mechanism (23). Further, when returning from the facing mode (M2) to the laterally located mode (M1), the other seat (20) can be switched to the laterally located mode (M1) in a small moving space.

Further, the vertically located position (Q2) of the other seat (20) is a position beyond the one seat (10) in the rear direction. With such a configuration, the seated occupants can be seated facing each other in the front-rear direction more appropriately.

Further, the vertically located position (Q2) of the other seat (20) is a position completely beyond the one seat (10) in the rear direction. With such a configuration, the seated occupants can be seated facing each other in the front-rear direction even more appropriately.

A distance between in the seat width direction between the other seat (20) in the vertically located position (Q2) and the one seat (10) is larger than a distance in the seat width direction between the other seat (20) the other seat (20) in the laterally located position (Q1) and the one seat (10). With such a configuration, the seated occupants can be seated facing each other in the front-rear direction more appropriately.

The rotating mechanism (14) is configured to switch the one seat (10) from the state where the one seat (10) faces the vehicle front direction (P1) to be locked to a state where the one seat (10) faces an obliquely inward direction (P3) where the one seat (10) is rotated inward to face the other seat (20) side at an angle of less than 90 degrees to be locked. With this configuration, the rotating mechanism (14) can further switch the one seat (10) to a close mode (M3) in which the one seat (10) comes close to the other seat (20).

The other seat (20) is disposed at an angle facing an oblique front direction (D3) between an oblique front sliding direction (D1) by the slide mechanism (23) and the vehicle front direction (D2). Accordingly, the other seat (20) is disposed to face the oblique front direction (D3) oriented more to the front of the vehicle than the oblique front sliding direction (D1), and thus the seated occupants can be seated side by side or facing each other in the front-rear direction more appropriately since the other seat (20) is more directed towards the adjacent seat (10).

Further, a rotation center (R) of rotating the one seat (10) by the rotating mechanism (14) is set at a position eccentric, in a plan view, from a shape center (C) of the one seat (10) in the front direction and in the seat width direction away from the other seat (20). With such a configuration, the protruding of the one seat (10) toward the other seat (20) can be suppressed during and after the switching of the one seat (10) from the vehicle front direction (P1) to the vehicle rear direction (P2) by rotating inward, and the seated occupants can be seated facing each other in the front-rear direction more appropriately while the two seats (10, 20) can be brought closer to each other.

Embodiment 2

Schematic Configuration of Seat Structure 1

Figure 10:
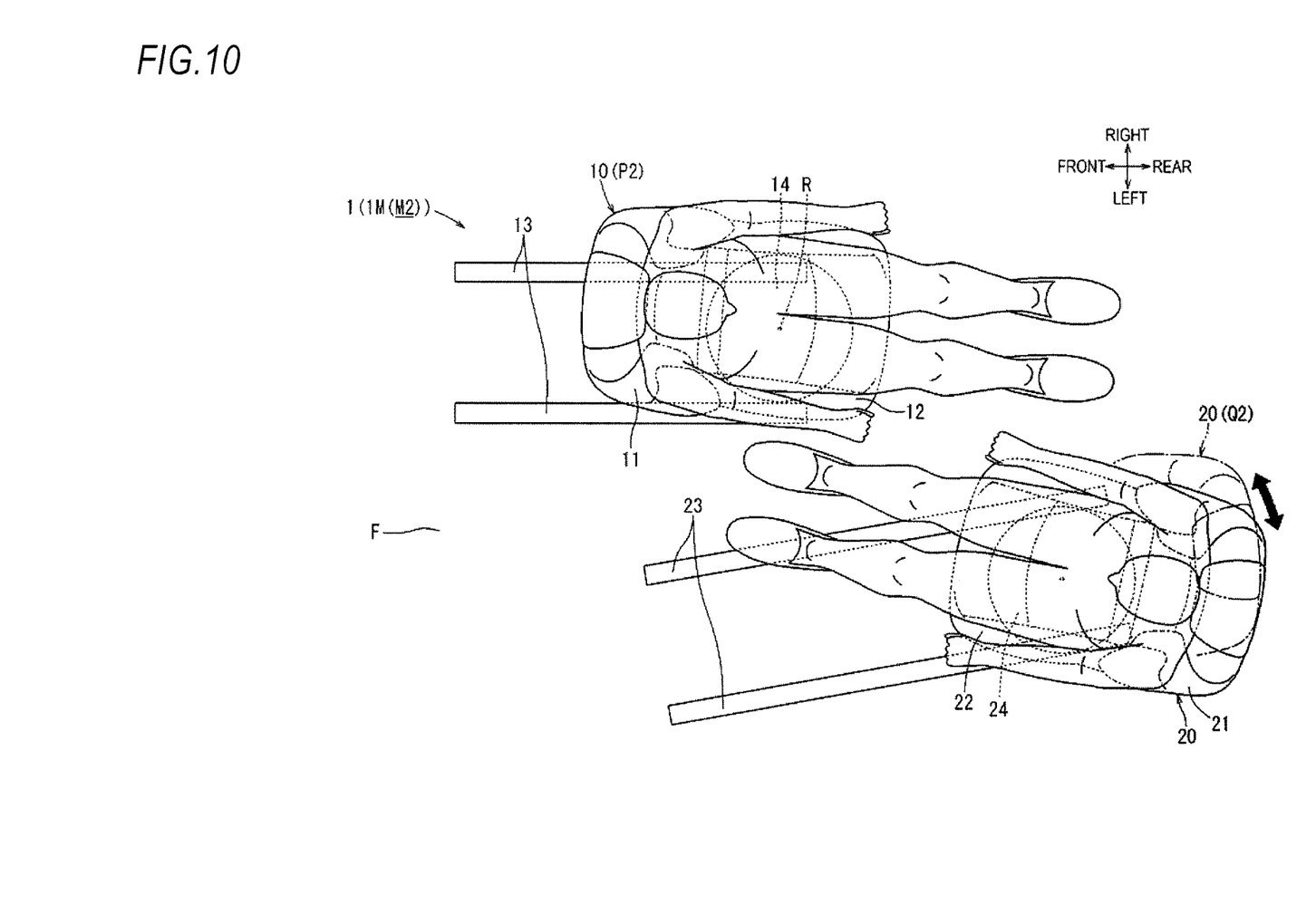
FIG. 10 is a perspective view showing a schematic configuration of a vehicle seat structure according to Embodiment 2.

Next, the seat structure 1 (the vehicle seat structure) of Embodiment 2 will be described with reference to FIG. 10. In the present embodiment, as a component of the mode switching mechanism 1M, a rotating mechanism 24 capable of rotating the left seat 20 (corresponding to "the other seat" in the present disclosure) inward (clockwise) and outward (counterclockwise) in a horizontal direction with respect to the vehicle floor surface F is provided.

With the above configuration, since the left seat 20 can be oriented in the inward direction which is directed to the right seat 10 (corresponding to the "one seat" in the present disclosure) and in the outward direction which turns the back to the right seat 10; it is possible to further arrange the arrangement relation by combination with the various modes shown in Embodiment 1. The rotating mechanism 24 provided on the left seat 20 has substantially the same basic structure as the rotating mechanism 14 provided on the right seat 10. Since the configurations other than the above are the same as those of the seat structure 1 described in Embodiment 1, the same configurations are denoted by the same reference numerals, and a detailed description thereof will be omitted.

Other Embodiments

Although modes for carrying out the present disclosure has been described with two embodiments, the present disclosure can be carried out in various modes other than the above embodiment. For example, the configurations of the vehicle seat structure of the present disclosure can be widely applied to a car other than an automobile such as a railway, or a seat structure provided for various vehicles such as an aircraft and a ship.

The left-right arrangement relationship between the one seat and the other seat may be opposite to the arrangement relationship shown in each of the embodiments. Further, the rotating direction where the one seat is rotated by the rotating mechanism between the vehicle front direction and the vehicle rear direction may be an outward direction which turns the back to the other seat in addition to an inward direction toward the other seat. Further, the rotation center of the one seat may be set at a position concentric with the shape center of the one seat in a plan view and may also be set at a position eccentric to any direction from the position concentric with the shape center.

Further, the direction where the other seat is moved obliquely in the seat width direction when moving backward from the laterally located position to the vertically located position by the slide mechanism may be a direction away from the one seat in addition to the direction toward the one seat. In addition, the other seat may be disposed so as to straightly face the oblique front sliding direction by the slide mechanism or the vehicle front direction.

In addition, the rotating mechanism or the slide mechanism may be driven by an electric unit in addition to being moved by a manual lock releasing operation.

The disclosure provides illustrative, non-limiting examples as follows:

According to a first aspect, there is provided a vehicle seat structure including: a mode switching mechanism which is configured to switch configurations of two seats between a laterally located mode in which seated occupants can be seated on the two seats side by side in a seat width direction and a facing mode in which the seated occupants can be seated on the two seats to face each other in a front-rear direction, wherein the mode switching mechanism includes: a rotating mechanism which is configured to switch one seat of the two seats between a state where the one seat faces a vehicle front direction and a state where the one seat faces a vehicle rear direction by rotating the one seat; and a slide mechanism which is configured to move another seat of the two seats from a laterally located position where the other seat is located side by side with the one seat to a vertically located position where the other seat is located to face, in the front-rear direction, the one seat facing the vehicle rear direction by obliquely sliding the other seat in a rear direction and in the seat width direction from the laterally located position.

According to the first aspect, when forming the facing mode, the other seat can be switched to the facing mode in a small moving space through obliquely sliding in the rear direction and in the seat width direction by the slide mechanism. Further, when returning from the facing mode to the laterally located mode, the other seat can be switched to the laterally located mode in a small moving space.

According to a second aspect, there is provided the vehicle seat structure according to the first aspect, wherein the vertically located position of the other seat is a position beyond the one seat in the rear direction.

According to the second aspect, the seated occupants can be seated facing each other in the front-rear direction more appropriately.

According to a third aspect, there is provided the vehicle seat structure according to the second aspect, wherein the vertically located position of the other seat is a position entirely beyond the one seat in the rear direction.

According to the third aspect, the seated occupants can be seated facing each other in the front-rear direction even more appropriately.

According to a fourth aspect, there is provided the vehicle seat structure according to any one of the first to third aspects, wherein a distance in the seat width between the other seat in the vertically located position and the one seat is larger than a distance in the seat width direction between the other seat in the laterally located position and the one seat.

According to the fourth aspect, the seated occupants can be seated facing each other in the front-rear direction more appropriately.

According to a fifth aspect there is provided the vehicle seat structure according to the fourth aspect, wherein the rotating mechanism is configured to switch the one seat from the state where the one seat faces the vehicle front direction to be fixed to a state where the one seat faces an obliquely inward direction where the one seat is rotated inward to face the other seat side at an angle of less than 90 degrees to be fixed.

According to the fifth aspect, the rotating mechanism can further switch the one seat to a close mode in which the one seat comes close to the other seat.

According to a sixth aspect, there is provided the vehicle seat structure according to any one of the first to fifth aspects, wherein the other seat is disposed at an angle facing an oblique front direction which is between an oblique front sliding direction by the slide mechanism and the vehicle front direction.

According to the sixth aspect, the other seat is disposed to face the oblique front direction oriented more to the vehicle front than the oblique front sliding direction, and thus the seated occupants can be seated side by side or facing each other in the front-rear direction more appropriately since the other seat is more directed towards the adjacent seat.

According to a seventh aspect, there is provided the vehicle seat structure according to any one of the first to sixth aspects, wherein a rotation center of rotating the one seat by the rotating mechanism is set at a position eccentric, in a plan view, from a shape center of the one seat in the front direction and in the seat width direction away from the other seat.

According to the seventh aspect, the protruding of the one seat toward the other seat can be suppressed during and after the switching of the one seat from the vehicle front direction to the vehicle rear direction by rotating inward, and the seated occupants can be seated facing each other in the front-rear direction more appropriately while the two seats can be brought closer to each other.

What is claimed is:

1. A vehicle seat structure comprising:
    a mode switching mechanism which is configured to switch configurations of two seats between a laterally located mode in which occupants seated on the two seats are positioned side by side in a seat width direction and a facing mode in which the occupants seated on the two seats face each other in a front-rear direction,
    wherein the mode switching mechanism includes:
        a rotating mechanism which is configured to switch one seat of the two seats between a state where the one seat faces a vehicle front direction and a state where the one seat faces a vehicle rear direction by rotating the one seat; and
        a slide mechanism which is configured to move another seat of the two seats from a laterally located position where the other seat is located side by side with the one seat to a vertically located position where the other seat is located to face, in the front-rear direction, the one seat facing the vehicle rear direction by obliquely sliding the other seat in the vehicle rear direction and in the seat width direction from the laterally located position, wherein the slide mechanism is further configured to slide the one seat in the front-rear direction, and wherein the one seat is in a rearmost position when the two seats are in the laterally located position.

2. The vehicle seat structure according to claim 1, wherein the vertically located position of the other seat is a position beyond the one seat in the vehicle rear direction.

3. The vehicle seat structure according to claim 2, wherein the vertically located position of the other seat is a position entirely beyond the one seat in the vehicle rear direction.

4. The vehicle seat structure according to claim 1, wherein a distance in the seat width direction between the other seat in the vertically located position and the one seat is smaller than a distance in the seat width direction between the other seat in the laterally located position and the one seat.

5. The vehicle seat structure according to claim 4, wherein the rotating mechanism is configured to switch the one seat from the state where the one seat faces the vehicle front direction to be locked to a state where the one seat faces an obliquely inward direction where the one seat is rotated inward to face the other seat side at an angle of less than 90 degrees to be locked.

6. The vehicle seat structure according to claim 1, wherein the other seat is disposed at an angle facing an oblique front direction which is between an oblique front sliding direction by the slide mechanism and the vehicle front direction.

7. The vehicle seat structure according to claim 1, wherein a rotation center of rotating the one seat by the rotating mechanism is set at a position eccentric, in a plan view, from a shape center of the one seat in the vehicle front direction and in the seat width direction away from the other seat.

8. The vehicle seat structure according to claim 1, wherein the slide mechanism includes:
a first slide rail extending in the front-rear direction such that the one seat is slidable along the first slide rail in the front-rear direction;
a second slide rail extending in an oblique direction with respect to the first slide rail extending in the front-rear direction, such that the other seat is slidable along the second slide rail in the oblique direction from the laterally located position to the vertically located position.

9. The vehicle seat structure according to claim 8, wherein
wherein a rear end of the second slide rail is located further rearward than a rear end of the first slide rail.

10. The vehicle seat structure according to claim 9, wherein
a front end of the second slide rail is located further forward than the rear end of the first slide rail.

11. The vehicle seat structure according to claim 9, wherein the one seat is positioned at the rear end of the first slide rail when the two seats are in the laterally located position.

12. The vehicle seat structure according to claim 8, wherein
the first slide rail includes slide rails extending in parallel to each other, and
the second slide rail includes slide rails extending in parallel to each other.

13. The vehicle seat structure according to claim 8, wherein an orientation of the other seat is fixed to face an oblique front direction which is between the oblique direction in which the second slide rail extends and the vehicle front direction.

* * * * *